(12) United States Patent
Hagenlocher et al.

(10) Patent No.: US 8,365,143 B2
(45) Date of Patent: Jan. 29, 2013

(54) DYNAMIC LANGUAGES FOR STATIC HOSTS

(75) Inventors: Curt Oliver Hagenlocher, Mercer Island, WA (US); Anthony Moore, Seattle, WA (US); John Lam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 12/816,240

(22) Filed: Jun. 15, 2010

(65) Prior Publication Data
US 2011/0307859 A1 Dec. 15, 2011

(51) Int. Cl.
*G06F 9/44* (2006.01)
*G06F 9/45* (2006.01)
*G06F 9/445* (2006.01)

(52) U.S. Cl. .......................... 717/106; 717/140; 717/174

(58) Field of Classification Search .................. None
See application file for complete search history.

(56) References Cited

U.S. PATENT DOCUMENTS

| | | | |
|---|---|---|---|
| 6,275,868 B1 * | 8/2001 | Fraley et al. ................... | 719/320 |
| 7,647,582 B2 * | 1/2010 | Krishnaswamy et al. ..... | 717/140 |
| 7,698,685 B2 * | 4/2010 | Pepin et al. .................... | 717/174 |
| 7,725,873 B2 * | 5/2010 | Shepard et al. ................ | 717/106 |
| 2004/0006762 A1 * | 1/2004 | Stewart et al. ................. | 717/106 |
| 2007/0006139 A1 * | 1/2007 | Rubin et al. .................... | 717/106 |
| 2007/0083512 A1 * | 4/2007 | Pepin et al. .................... | 707/6 |
| 2007/0156727 A1 | 7/2007 | Lim | |
| 2008/0092115 A1 | 4/2008 | Borgsmidt | |
| 2008/0127055 A1 * | 5/2008 | Davis et al. .................... | 717/106 |
| 2008/0222627 A1 * | 9/2008 | Kaplan et al. .................. | 717/170 |
| 2009/0172063 A1 * | 7/2009 | Chirilov et al. ................ | 708/441 |
| 2011/0307874 A1 * | 12/2011 | Messerly et al. ............... | 717/140 |
| 2012/0036496 A1 * | 2/2012 | Yang et al. ..................... | 717/174 |

OTHER PUBLICATIONS

Whitechapel et al, "What You Need to Know About Using Office as a Development Platform", Aug. 2006, MSDN Magazine, pp. 1-8; <http://msdn.microsoft.com/en-us/magazine/cc163559.aspx>.*

Li et al., "Tool Support for Refactoring Functional Programs", Jan. 2008, ACM, pp. 199-203; <http://dl.acm.org/citation.cfm?doid=1328408.1328437>.*

Greiler et al., "Understanding Plug-in Test Suits from an Extensibility Perspective", 2010 IEEE, pp. 67-76; <http://ieeexplore.ieee.org/stamp/stamp.jsp?tp=&arnumber=5645457>.*

Andre Pang, et al.,Plugging Haskell in, http://news.cnet.com/microsoft-news/?keyword=HealthVault, 12 Pages, Published Sep. 22, 2004.

User-defined Functions in Excel 207 and Web Services, http://savas.me/blog/617, 4 Pages, Published Feb. 11, 2007.

(Continued)

*Primary Examiner* — Thuy Dao
*Assistant Examiner* — Ben C Wang
(74) *Attorney, Agent, or Firm* — Workman Nydegger

(57) ABSTRACT

Using language add-ins with one or more static extensibility points of an application host. The method includes searching for user code in a user code store. Some user code is found in the user code store. A determination is made as to the language of the user code from among a plurality of predefined languages. The user code is provided to a language provider for the determined language. A function invocation is received from an application host. The function invocation is matched to at least a portion of the user code. The at least a portion of user code corresponding to the function invocation is executed via the language provider.

20 Claims, 2 Drawing Sheets

OTHER PUBLICATIONS

Holger Knublauch et al., The Protege OWL Plugin: An Open Development Environment for Semantic Web Applications, Stanford Medical Informatics, 15 Pages, Retrieved Apr. 15, 2010.

Kristis Makris et al., Immediate Multi-Threaded Dynamic Software Updates Using Stack Reconstruction, Arizona State University, 14 Pages, Retrieved Apr. 15, 2010.

What is the Silverlight Dynamic Languages SDK?, http://www.silverlight.net/learn/dynamic-languages, 3 Pages, Retrieved Apr. 15, 2010.

Add-in Express ToysTM.net, http://www.add-in-express.com/free-addins.net-excel-addin.php, 2 Pages, Retrieved Apr. 15, 2010.

* cited by examiner

DYNAMIC LANGUAGES FOR STATIC HOSTS

BACKGROUND

Background and Relevant Art

Computers and computing systems have affected nearly every aspect of modern living. Computers are generally involved in work, recreation, healthcare, transportation, entertainment, household management, etc.

Computer applications often include extensibility functionality. In particular, applications may be optimized to, in addition to supporting native functions, plug in static functions from a single compiled language.

Host applications such as Word® and Excel® available from Microsoft Corporation of Redmond Wash. support native functions. Examples of native function in Excel® include SUM, MAX, MIN, VLOOKUP, etc.

Host applications such as Word® and Excel® available from Microsoft Corporation of Redmond Washington allow Visual Basic® code to be used to extend the base functionality of those applications. In particular, they include a Visual Basic® interface that allows programmers to supply compiled code with functionality for performing functions that are not native to the host applications. However, typically only a single compiled language can be used at a time. This can make it difficult to provide extensibility using dynamic languages such as M, R and Python®.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of using language add-ins with one or more static extensibility points of an application host. The method includes searching for user code in a user code store. Some user code is found in the user code store. A determination is made as to the language of the user code from among a plurality of predefined languages. The user code is provided to a language provider for the determined language. A function invocation is received from an application host. The function invocation is matched to at least a portion of the user code. The at least a portion of user code corresponding to the function invocation is executed via the language provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments allow a plurality of languages to extend an application host (e.g Excel®) with procedural functions even if the languages have source dynamically changing at runtime, and even if the extensibility points are targeted at statically-defined or exported functions. For example, Excel®'s full multi-threading model is only designed for direct use by native compiled code with a set of entry points that is fixed for the lifetime of the process. However, embodiments allow multiple dynamic languages to be plugged in, even if the functions are dynamically being added, removed, updated or having their signatures changed. This allows multi-threading functionality to be achieved even with dynamic code. In particular, embodiments may compile static code from dynamic code that can be used with multi-thread enabled interfaces. Dynamic code is code that can change dynamically at runtime and is not statically compiled prior to runtime.

Additionally, embodiments may use dynamic code generation to enable functions to be added, removed, updated and have signatures changed even if the application host expects these to be fixed for the lifetime of the process. For example, an application host may expect functions to be statically defined. However, embodiments allow functions to be defined dynamically and yet be available to the application host immediately instead of waiting for static compiling.

Figure 1:
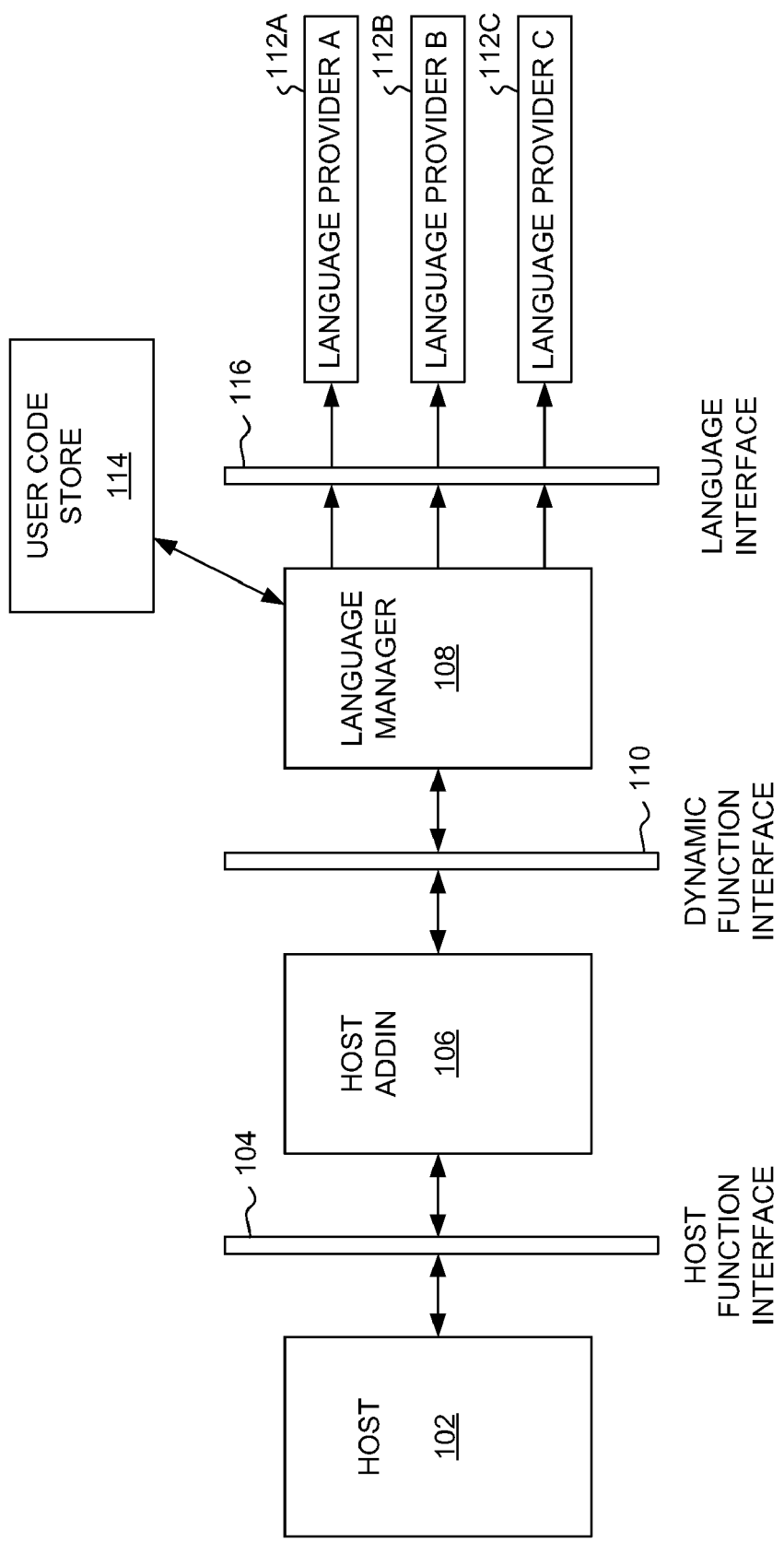
FIG. 1 illustrates a diagrammatic representation of a system for using language extensions with application hosts.

Referring now to FIG. 1, an example embodiment is illustrated. FIG. 1 illustrates an Application Host 102. Examples of application hosts have been illustrated previously herein as applications such as Excel® and Word®. These are merely examples, and other application hosts 102 with extensibility interfaces could be used.

FIG. 1 further illustrates Host Function Interface 104. The Host Function Interface 104 is an interface provided by an Application Host 102 for registering functions. The Host Function Interface 104 is typically dependent on the functions being static. Static means that the interface and implementation of a function is fixed when it is compiled and cannot change in any way during the lifetime of the process that is consuming it (e.g. the lifetime of the Excel® session). Examples of Host Function Interfaces in Excel® include VBA, COM, VSTO, and XLLs.

FIG. 1 further illustrates a Host AddIn component 106. This is an add-in component for the Application Host 102 that does the work of consuming a dynamic function and exposing it to the static Host Function Interface 104. In one specific implemented embodiment the Host AddIn component 106 it is a tightly coupled pair of Excel® extensions—a native XLL and a COM AddIn. In the illustrated example, the Host AddIn component 106 calls bidirectionally via the Host Function Interface 104 with the Application Host 102. As will be demonstrated below, the Host AddIn component 106 also calls bidirectionally with the Language Manager 108 via the Dynamic Function Interface 110.

The Dynamic Function Interface 110 is an abstraction of a flat set of functions that can be continually be added to, removed from, updated or have their signatures changed. Individual APIs are provided to enumerate functions, describe individual function signatures and execute them. It can also provide notification when the function set changes.

The Language Manager 108 is a component that manages a set of plugged in language adapters (Language Providers A, B, and C, 112A, 112B, and 112C respectively) and a dynamic User Code Store 114 and talks to the Host AddIn 106 to provide and execute the dynamic set of functions. The Language Manager 108 calls bidirectionally with the Host AddIn component 106. The Language Manager 108 calls bidirectionally with the User Code Store 114. The Language Manager 108 calls into the set of Language Providers 112A, 112B, and 112C.

The Language Interface 116 is a service provided by a language to enumerate functions and their signatures based on source code, and to execute the functions.

The User Code Store 114 is a store of user code with events that detect changes. In the illustrated implementation, this is a list of directories containing source code files, and a file system watching component to detect changes. The User Code Store 114 calls bidirectionally with the Language Manager 108.

Language Providers are referred to generally as 112 and Language Providers 112A, 112B, and 112C are illustrated specifically in FIG. 1. For each language that plugs into the system, a Language Provider 112 implements a simple interface layer that can enumerate functions and signatures and execute them. Language Providers 112 are called by the Language Manager 108. Language Providers 112 call language-specific services.

A specific example is now illustrated. In particular, the embodiment illustrates ways of dynamically creating user-defined functions (UDFs) for use within Excel® using the M language as implemented by Mathworks® of Natick Mass.

There are several extensibility models for Excel® provided by Microsoft®. VBA is the best-known. COM support allows development of UDFs in any language that supports IDispatch components. VSTO is a .NET®-based programming model built on top of COM support. XLLs represent another extensibility point choice for Excel.

The present illustrated embodiment includes three components. The first is a VSTA component, referred to herein as "DynamicAddin.dll", which orchestrates the dynamic update of UDFs. In the example illustrated in FIG. 1, DynamicAddin.dll is an implementation of a portion of the Host AddIn 106. The second component is a native component referred to herein as "DynamicRuntime.xll", which defines the entry points and builds thunks to call back into managed code. This second component may be an implementation of a portion of the Host AddIn 106. The third component is referred to herein as "DynamicServer.exe" and in the present example, hosts M. DynamicServer.exe may be an implementation of the Language Manager 108.

DynamicAddin.dll is the driver of the integration. Its job is to find all of the UDFs on predefined file system paths and to expose those UDFs to Excel®.

At startup, DynamicAddin.dll first initializes the DynamicRruntime. It then establishes a connection to the language-specific piece, e.g. a Language Provider 112. Once it is able to make use of a Language Provider 112, it searches its path for all of the files in the User Code Store 114 matching the appropriate file specification—"*.m", in the case of M. It treats each of these as a "new file" At the same time, it sets up a FileSystemWatcher to look for new, changed and deleted files matching the same directory and file specification.

For a new file in the User Code Store 114, the present example uses the Language Provider 112 to parse the file and extract information about the UDFs contained therein. In particular, embodiment may use function names and signatures for languages. Additional language-specific information may also be used to intemperate with that particular Language Provider 112. Additionally, there may be facts about the UDF which may affect how the function is registered with Excel, provided the Language Provider 112 is able to provide the information. For example, it may be useful to know if the function is volatile. A volatile function is one that may return a different value every time you use it—even if the function parameters are the same. Examples of volatile functions are random numbers and current time. If so, embodiments may be implemented to ensure that recalculation behavior is consistent with built-in volatile functions. In another example, it may be useful to know if work is being performed locally or on a different machine. If the latter, embodiments may mark the function as asynchronous so that Excel's® recalculation engine will continue to use this core to calculate cells in the spreadsheet.

For M, only the single top-level function is extracted. The function is currently assumed to be volatile and local, as no analysis has been performed yet to indicate otherwise. Once the function information has been extracted, DynamicRuntime.xll is used to register the function with Excel®.

When a file in the User Code Store 14 has changed, embodiments reparse the file and—if necessary—reregister any UDFs in the file whose profile has changed. In particular, UDFs can be reregistered with the Language Manager 108. The Language Manager 108 may additionally notify the Host Application 102 of changes to UDFs so that the Host Application 102 can ensure that any data dependent on a UDF is updated to reflect the changes. For example, one UDF may be a formula for calculating some data. Changes to the formula, will result in changes to the data. Thus, any data in the Application Host 102 that is dependent on the UDF can be recalculated using the UDF when the UDF changes.

When a file is deleted from the User Code Store 114, embodiments unregister any UDFs that it contained. Again, this can be propagated back to the Application Host 102.

At startup, DynamicAddin.dll creates a single delegate for execution and passes it to the XLL by using GetModuleHandle (a C++ function call that retrieves a module handle for the specified module, the module having been loaded by the calling process) and GetProcAddress (a C++ function call that retrieves the address of an exported function or variable from the specified dynamic-link library) through P/Invoke (which allows developers to invoke native unmanaged methods from managed code). In the one implementation, the delegate is typed to take an opaque HGLOBAL (which is a Windows® compatibility type for use in resources) with the parameters and to return an opaque HGLOBAL with the result. In one embodiment, the DynamicAddin.dll itself does not unwrap this data; it simply forwards it to DynamicServer.exe, which knows how to deserialize it.

Embodiments may support multiple delegate signatures as part of the support for additional languages beyond M.

One interesting complication is that some languages support only a single thread. To accommodate this, calls to DynamicServer are serialized by the DynamicAddin.dll. This is implemented by having the connection owned by a thread containing a WPF Dispatcher, and having the execution function post "execution delegates" to that Dispatcher.

The runtime, DynamicRuntime.xll provides low-level services for DynamicAddin.dll. In particular, it contains the predefined module entry points that Excel® needs to register functions to an XLL.

Each entry point includes two assembly language instructions, the load of a scratch register (eax/rax) with an immediate value and an indirect jump through that register. When the code is first loaded from disk, the immediate value is initialized with the offset of a function which will return a NULL back to Excel®. If such a function had been registered to return an XLOPER12, which is an Excel®-specific variant type, Excel® will interpret this value as a #NUM! error.

One embodiment of the runtime includes 1000 such entry points, and an array of 1000 slots which contain the structures used to manage these entry points. The number 1000 was chosen arbitrarily. Embodiments may use multiple DLLs to grow this number dynamically.

Illustrating now registration functionality, assume there is a desire to dynamically register the M function "Quux" with an arity 3. Embodiments may search through the array to find an empty slot. Because this is the first dynamic function being registered, slot zero is available. This corresponds to the entry point Thunk000.

When registering an XLL UDF to Excel®, the data type of each parameter is specified. This can be one of several specific data types (like float64 or int32) or it can be the "XLOPER12" data type, which is an Excel®-specific variant type. The use of XLOPER12 aligns nicely with dynamically-typed languages like M, R and Python®. The data contained in the XLOPER12 is simply marshaled into an appropriate form and the language implementation decides what to do with it.

When registering an XLL UDF to Excel®, the data type of each parameter is specified. This can be one of several specific data types (like float64 or int32) or it can be the "XLOPER12" data type, which is an Excel®-specific variant type. The use of XLOPER12 aligns nicely with dynamically-typed languages like M, R and Python. The data contained in the XLOPER12 is simply marshaled into an appropriate form and the language implementation decides what to do with it.

Another advantage of using exclusively XLOPER12 arguments is that it simplifies the thunking code that needs to be emitted. The parameters can be packaged into an array of XLOPER12 and then control can be transferred to a C++ helper function.

In the case of Quux, the thunk effectively contains the following code:

```
extern LPXLOPER12 WINAPI DynamicExecute(int token, int argc,
LPXLOPER12 argv[ ]);
LPXLOPER12 Quux(LPXLOPER12 foo, LPXLOPER12 bar,
LPXLOPER12 baz) {
    LPXLOPER12 argv[ ] = { foo, bar, baz };
    const LPVOID quux_token = 0x12345678; // Replaced with
    appropriate value return DynamicExecute(quux_token, 3, argv)
}
```

For simplicity, the current implementation uses VirtualAlloc to allocate a 4K page for each thunk, and VirtualFree to release it when the function is unregistered. However other embodiments may optimize this as the thunks use considerably less than the 4K.

After generating the thunk, the original entry point is patched.

```
Thunk000 proc export
    mov    eax, Quux ; <-- this address is replaced with that of the
    thunk
    jmp    eax
Thunk000 endp
```

Currently, the token embeded into the thunk is simply the position of this function in the management array. That is, the first registered function will have a value of 0. This is also the token that is returned to DynamicAddin.dll when the function is registered.

Unregistration is the mirror of registration. In addition to freeing the thunk's memory, the code in the entry point is also redirected so that points back to a neutral (NULL-returning) function.

In the illustrated example, register, unregister and reregister are called through Excel®'s object model using Application.Run. This ensures that Excel® is in the proper state for the calls to xlfRegister and xlfUnregister. Calculation is modal in Excel®, with the object model locked out until calculation is complete. This means that the three functions will only be called on the UI thread, and only when there is no calculation in progress. Similarly, if a call to a UDF is in progress, either Excel® is modally "in calc" (which means that the object model is locked out and definition, undefinition or redefinition cannot happen) or the UDF is actually being called via Application.Run.

Asynchronous calls complicate this slightly. In particular, the user can terminate calc mode while an async call is in progress. Careful cleanup can be used to address this complication.

The server, DynamicServer.exe, is accessed via Windows Communication Foundation® (WCF). DynamicServer.exe knows how to serialize and deserialize the marshaling format used by DynamicRuntime.xll and it knows how to construct and examine the objects that make up the M API.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Figure 2:
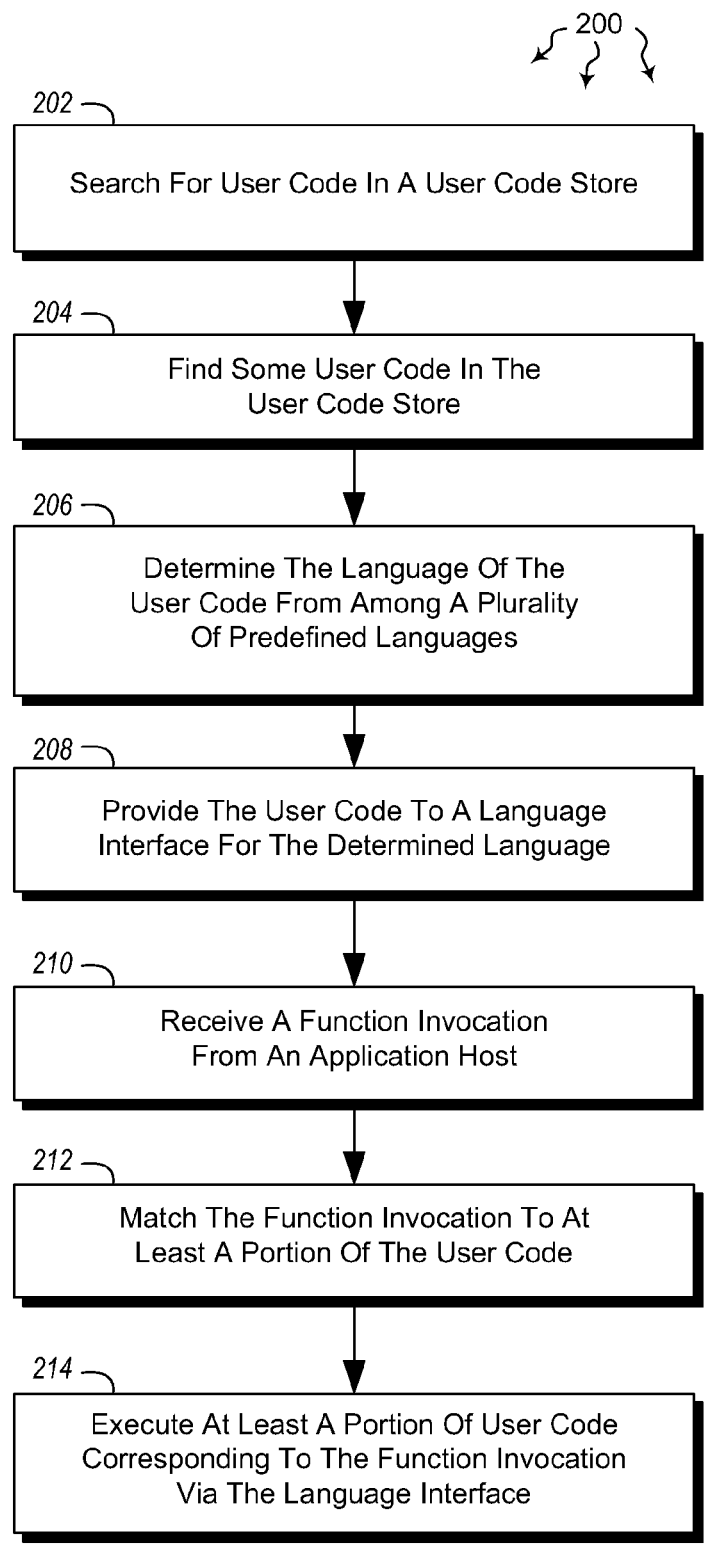
FIG. 2 illustrates a method of using language add-ins with one or more static extensibility points of an application host.

Referring now FIG. 2, a method 200 is illustrated. The method 200 includes acts for using language add-ins with one or more static extensibility points of an application host. The method includes searching for user code in a user code store (act 202). For example, the language manager 108 illustrated in FIG. 1 may search for user code in a language supported by one of the language providers 112 in the User Code Store 114. Embodiments may be implemented where the user code is dynamic user code. In particular, dynamic code is code that can change dynamically at runtime.

Some embodiments may further include dynamically generating static code corresponding to the executed user code; returning the dynamically generated static code to a static code interface of the application host.

The method 200 further includes finding some user code in the user code store (act 204). For example, user code may be found by the language manager 108 in the User Code Store 114.

The method 200 further includes determining the language of the user code from among a plurality of predefined languages (act 206). In particular, a developer may define a fixed set of languages supported. The fixed set is limited by language providers implemented. FIG. 1 illustrates a number of language providers 112A, 112B and 112C that each support a language. The user code may be determined to be written in a language supported by one of the language providers 112.

The method 200 further includes providing the user code to a language provider for the determined language (act 208). In the example illustrated, language providers are illustrated by the language providers 112A, 112B, and 112C. In particular, the user code can be registered with a particular language provider. For example, a developer may create a function using a non-natively supported language of an application host. The developer may develop the function using the non-natively supported language, but the application host may have access to the function through extensibility interfaces of the application host. The function may be registered with an appropriate language provider such that when a user at the application host requests that the function be executed, the function can be executed by the appropriate language provider. The method 200 may be practiced where the language provider includes a runtime for the determined language. In an alternative embodiment, the method 200 may be practiced where the language provider is plugged into a runtime for the determined language.

The method 200 further includes receiving a function invocation from an application host (act 210). For example, the Application Host 102 may invoke a function. The function may be a function that is not natively supported by the Application Host 102, but which can be supported through the use of extension code. The function may be received by the language manager 108 through the dynamic function interface 110 from the host addin 106.

The method 200 further includes matching the function invocation to at least a portion of the user code (act 214). In particular, a determination may be made to determine that user code in the user store 114 can be used to perform the function.

The method 200 further includes executing the at least a portion of user code corresponding to the function invocation via the language provider (act 216). In particular, the Language Provider 112 can be used to execute the user code. The user code can be provided either directly to the language or through a plug-in that interfaces with the language.

The method 200 may further include returning results of executing the at least a portion of user code back to the application host.

In some embodiments, when the user code is dynamic code, the method 200 may further include an act of generating static code at runtime. This static code can be used at a static extensibility point, such as a point exposed by the Host Function Interface 104, of the Application Host 102 to allow to allow the static extensibility point to be initialized for use with dynamic user code.

As illustrated, the user code may be stored separate from the Application Host 102. Additionally the user code may be updated or changed by a developer. These changes can be accounted for by some embodiments. In particular, the method 200 may further include receiving user input changing the user code at the user code store. As a result, the method 200 may further include executing the changed user code using the langue provider, causing a changed result of executing the user code. As a result of the changed results of executing, the method 200 may further include propagating changes in results back to the application host. In particular, the language manager 108 and one of the language providers 112 as appropriate for the given language of the user code may be used to re-execute changed user code in the User Code Store 114.

With respect to the code store 114, the code store may be implemented in a number of different ways. For example, the code store 114 may include at least a portion of a spread sheet, at least a portion of a web site, or at least a portion of a database. Thus, the code store can be accessed by the Language Manager 108 in a number of different fashions as appropriate.

Embodiments of the method 200 may be practiced where receiving a function invocation from an application host, includes receiving a function to be executed by different threads of a system. In this embodiment, the method 200 may further include executing the user defined function on a plurality of different threads of the system. The method 200 may further include returning the dynamically generated static code to a static code interface that supports multi-threading.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of using language add-ins with one or more static extensibility points of an application host, the method comprising:
    parsing a user code store to search for user code in the user code store;
    finding some user code in the user code store;
    determining the language of the user code from among a plurality of predefined languages;
    providing the user code to a language provider for the determined language by registering the user code with a language manager that manages a set of plugged in language adaptors, where the language manager provides bi-directional communication between the language managers and an application host;
    receiving a function invocation from the application host;
    matching the function invocation to at least a portion of the user code;
    executing the at least a portion of user code corresponding to the function invocation via the language provider;
    providing the results of executing the at least a portion of the user code to the application host, where the application host uses the results for data that is dependent on the results;
    determining that the user code store has changed as a result of the user code changing;
    as a result of the user code store changing, reparsing the user code store and reregistering the user code with the language manager; and
    notifying the application host of changes to the user code such that the language host can recalculate any data dependent on the results of executing the user code.

2. The method of claim 1, further comprising returning results of executing the at least a portion of user code back to the application host.

3. The method of claim 1, wherein user code is dynamic user code.

4. The method of claim 3, further comprising generating static code at runtime for use with a static extensibility point of the application host to allow the static extensibility point to be initialized for use with dynamic user code.

5. The method of claim 1, further comprising:
    receiving user input changing the user code at the user code store;
    executing the changed user code using the langue provider, causing a changed result of executing the user code; and
    as a result of the changed results of executing propagating changes in results back to the application host such that data that was dependent on executing the user code is updated to be dependent on the changed user code.

6. The method of claim 1, wherein the user code store comprises at least a portion of a spread sheet.

7. The method of claim 1, wherein the user code store comprises at least a portion of a web site.

8. The method of claim 1, wherein the user code store comprises at least a portion of a database.

9. The method of claim 1, wherein the language provider comprises a runtime for the determined language.

10. The method of claim 1, wherein the language provider is plugged into a runtime for the determined language.

11. A system for using language add-ins with one or more static extensibility points of an application host, the system comprising:
    one or more processors;
    a memory storing a user code store;
    a language manager, wherein the language manager is configured to:
        parse user code to find user code in the user code store;
        determine the language of the user code from among a plurality of predefined languages;
        register the user code with the language manager;
        access a language provider, from among a plurality of language providers, for the determined language to execute the user code for the determined language;
        match function invocations to user code;
        provide the results of function invocation to an application host, where the application host uses the results for data that is dependent on the function invocation;
        determine that the user code store has changed as a result of user code changing;
        as a result of the user code store changing, reparsing the user code store and reregistering user code with the language manager; and
        notify the application host of changes to the user code such that the language host can recalculate any data dependent on the function invocations;
    a host application add-in, wherein the host application add-in is configured to receive a function invocation from an application host and to pass the function invocations from the application host to the language manager, whereafter the language manager accesses the language provider for the determined language and executes the function invocation.

12. The system of claim 11, wherein the language manager is configured to return results of executing the at least a portion of user code back to the application host.

13. The system of claim 11, wherein user code is dynamic user code.

14. The system of claim 13, wherein the language manager is configured to generate static code at runtime for use with a static extensibility point of the application host to allow the static extensibility point to be initialized for use with dynamic user code.

15. The system of claim 11, wherein the language manager is further configured for:
    receiving user input changing the user code at the user code store;
    executing the changed user code using the langue provider, causing a changed result of executing the user code; and
    as a result of the changed results of executing propagating changes in results back to the application host such that data that was dependent on executing the user code is updated to be dependent on the changed user code.

16. The system of claim 11, wherein the user code store comprises at least a portion of a spread sheet.

17. The system of claim 11, wherein the user code store comprises at least a portion of a web site.

18. The system of claim 11, wherein the user code store comprises at least a portion of a database.

19. A method of using language add-ins with one or more static extensibility points of an application host, the method comprising:
    parsing a user code store to search for dynamic user code in the user code store;
    finding some dynamic user code in the user code store;
    determining the language of the dynamic user code from among a plurality of predefined languages;
    providing the dynamic user code to a language provider for the determined language by registering the dynamic user code with a language manager that manages a set of plugged in language adaptors, where the language manager provides bi-directional communication between the language managers and an application host;
    receiving a function invocation from an application host;
    matching the function invocation to at least a portion of the dynamic user code;
    executing the at least a portion of user code corresponding to the function invocation via the language provider;
    dynamically generating static code corresponding to the executed user code;
    returning the dynamically generated static code to a static code interface of the application host
    providing the results of executing the at least a portion of the user code to the application host, where the application host uses the results for data that is dependent on the results;
    determining that the user code store has changed as a result of the user code changing;
    as a result of the user code store changing, reparsing the user code store and reregistering the user code with the language manager; and
    notifying the application host of changes to the user code such that the language host can recalculate any data dependent on the results of executing the user code.

20. The method of claim 19, wherein:
    receiving a function invocation from an application host, comprises receiving a function to be executed by different threads of a system;
    executing the at least a portion of user code corresponding to the function invocation via the language provider comprises executing on a plurality of different threads of the system;
    returning the dynamically generated static code to a static code interface of the application host comprises returning the dynamically generated static code to an interface that supports multi-threading.

* * * * *

UNITED STATES PATENT AND TRADEMARK OFFICE
CERTIFICATE OF CORRECTION

PATENT NO. : 8,365,143 B2
APPLICATION NO. : 12/816240
DATED : January 29, 2013
INVENTOR(S) : Hagenlocher et al.

It is certified that error appears in the above-identified patent and that said Letters Patent is hereby corrected as shown below:

In the Specification

Column 4, line 8, delete "intemperate" and insert -- interoperate --, therefor.

Column 5, lines 34-42, below "with it." delete "When registering an XLL UDF to Excel®, the data type of each parameter is specified. This can be one of several specific data types (like float64 or int32) or it can be the "XLOPER12" data type, which is an Excel®-specific variant type. The use of XLOPER12 aligns nicely with dynamically-typed languages like M, R and Python. The data contained in the XLOPER12 is simply marshaled into an appropriate form and the language implementation decides what to do with it.".

Column 8, line 1, delete "langue" and insert -- language --, therefor.

In the Claims

Column 10, line 21, in Claim 5, delete "langue" and insert -- language --, therefor.

Column 11, line 17, in Claim 15, delete "langue" and insert -- language --, therefor.

Signed and Sealed this
Tenth Day of February, 2015

Michelle K. Lee
*Deputy Director of the United States Patent and Trademark Office*